(12) United States Patent
Monogioudis et al.

(10) Patent No.: US 6,965,780 B1
(45) Date of Patent: Nov. 15, 2005

(54) REVERSE LINK OUTER LOOP POWER CONTROL WITH ADAPTIVE COMPENSATION

(75) Inventors: Pantelis Monogioudis, Edison, NJ (US); Kiran M Rege, Marlboro, NJ (US); Ashwin Sampath, Somerset, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/514,608

(22) Filed: Feb. 28, 2000

Related U.S. Application Data

(63) Continuation-in-part of application No. 09/052,696, filed on Mar. 31, 1998, now Pat. No. 6,434,124.

(51) Int. Cl.[7] .............................................. H04B 7/00
(52) U.S. Cl. ............................ 455/522; 455/506
(58) Field of Search ............... 455/522, 69, 453, 455/504, 505, 506; 370/318; 340/7.32, 7.33, 340/7.34

(56) References Cited

U.S. PATENT DOCUMENTS

| | | | |
|---|---|---|---|
| 5,247,470 A | 9/1993 | McKown et al. | 364/724.11 |
| 5,257,283 A | 10/1993 | Gilhousen et al. | 375/1 |
| 5,353,310 A | 10/1994 | Russell et al. | 375/101 |
| 5,386,589 A * | 1/1995 | Kanai | 455/423 |
| 5,528,593 A | 6/1996 | English et al. | 370/84 |
| 5,623,484 A * | 4/1997 | Muszynski | 370/335 |
| 5,727,033 A | 3/1998 | Weaver et al. | 375/358 |
| 5,903,551 A | 5/1999 | Kingston et al. | 370/355 |
| 5,940,749 A | 8/1999 | Cho et al. | 455/249 |
| 5,946,346 A | 8/1999 | Ahmed et al. | 375/219 |
| 5,956,649 A | 9/1999 | Mitra et al. | 455/522 |
| 5,991,284 A | 11/1999 | Willenegger et al. | 370/355 |
| 6,084,904 A * | 7/2000 | Wang et al. | 375/130 |
| 6,097,956 A | 8/2000 | Veeravalli et al. | 455/446 |
| 6,157,830 A * | 12/2000 | Minde et al. | 455/424 |
| 6,201,960 B1 * | 3/2001 | Minde et al. | 455/424 |
| 6,341,224 B1 * | 1/2002 | Dohi et al. | 455/522 |

FOREIGN PATENT DOCUMENTS

EP        0549019        4/1992        H04L 25/03

OTHER PUBLICATIONS

A. Sampath et al., "On Setting Reverse Link Target SIR In A CDMA System", *Vehicular Technology Conference*, 1997, IEEE 47th, Phoenix, AZ, USA, May 4-7, 1997, pp 929-933.

(Continued)

*Primary Examiner*—Nick Corsaro
(74) *Attorney, Agent, or Firm*—James Milton

(57) ABSTRACT

In a wireless communications system, a base station employs a bit error rate (BER) based Reverse Outer Loop Power Control (ROLPC) technique. The ROLPC technique uses either instantaneous or weakly filtered values of the BER for comparison with a BER target value for adjusting a target signal-to-noise ratio (SNR). The BER target value is varied as a function of a second order statistic (e.g. variance, standard deviation) of the received SNR. In another embodiment, a symbol error count based ROLPC technique uses adaptive SER targets. In particular, a base station uses a $2^{nd}$ order statistic, e.g., standard deviation (variance), to identify, or act as a signature of, a particular cellular (wireless) communications environment. The base station monitors the standard deviation of the symbol error count of a received signal (transmitted from a mobile station). The target signal-to-noise ratio $((E_b/N_0)_T)$ of this received signal is adjusted as a function of the value of the standard deviation and the adjusted $(E_b/N_0)_T$ target is used to provide power control.

37 Claims, 9 Drawing Sheets

OTHER PUBLICATIONS

Hsuan-Jung Su et al., "Adaptive Closed-Loop Power Control With Quantized Feedback and Loop Filtering", *The Ninth International Symposium on Personal, Indoor and Mobile Radio Communications*, 1998, Sep. 8-11, 1998, Boston, MA, USA, pp 926-931.

U.S. Patent Application of Rege, entitled "A Non-Adaptive Symbol Error Count Based Technique For CDMA Reverse Link Outer Loop Power Control", U.S. Appl. No. 09/052,581, filed on Mar. 31, 1998.

* cited by examiner

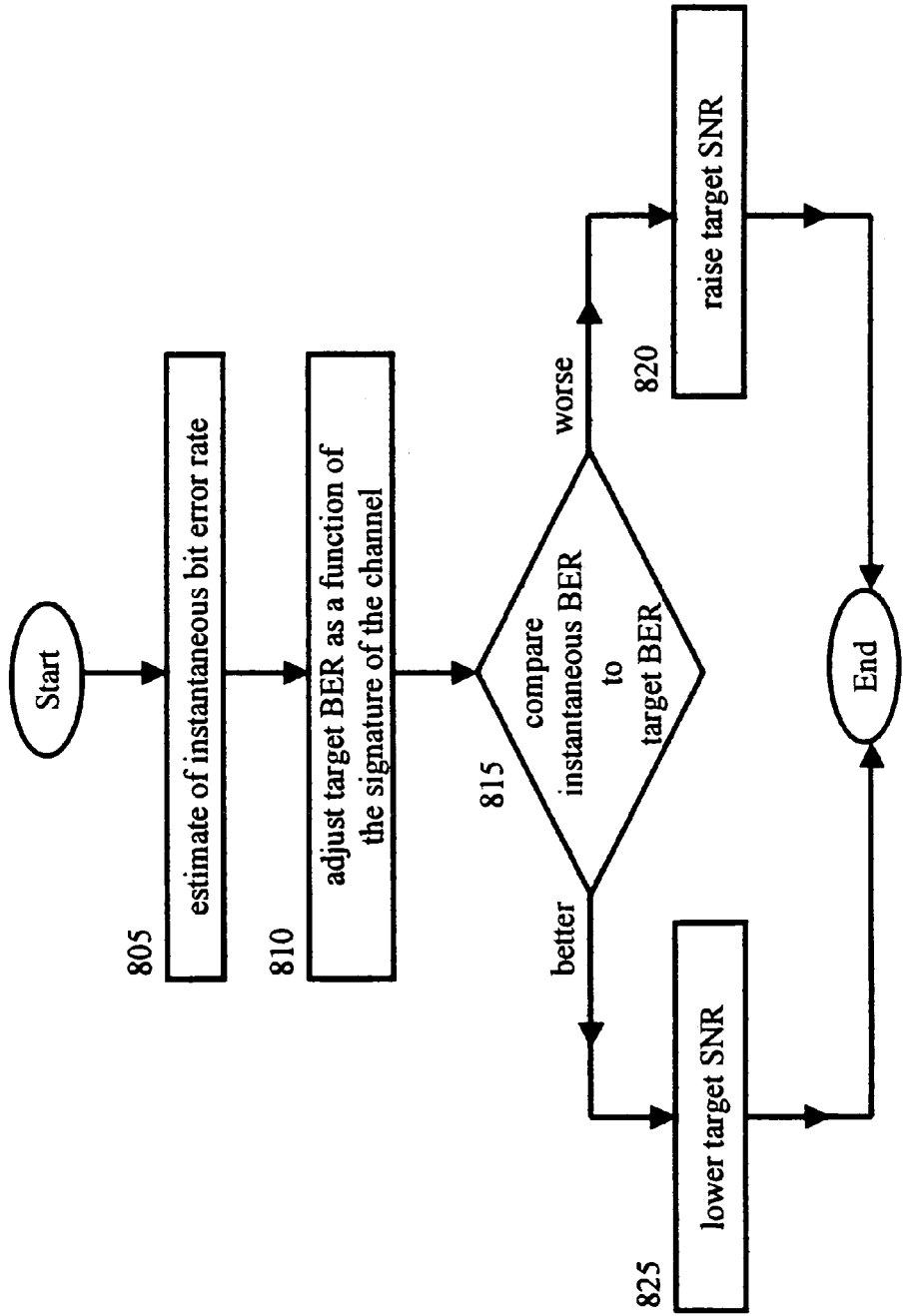

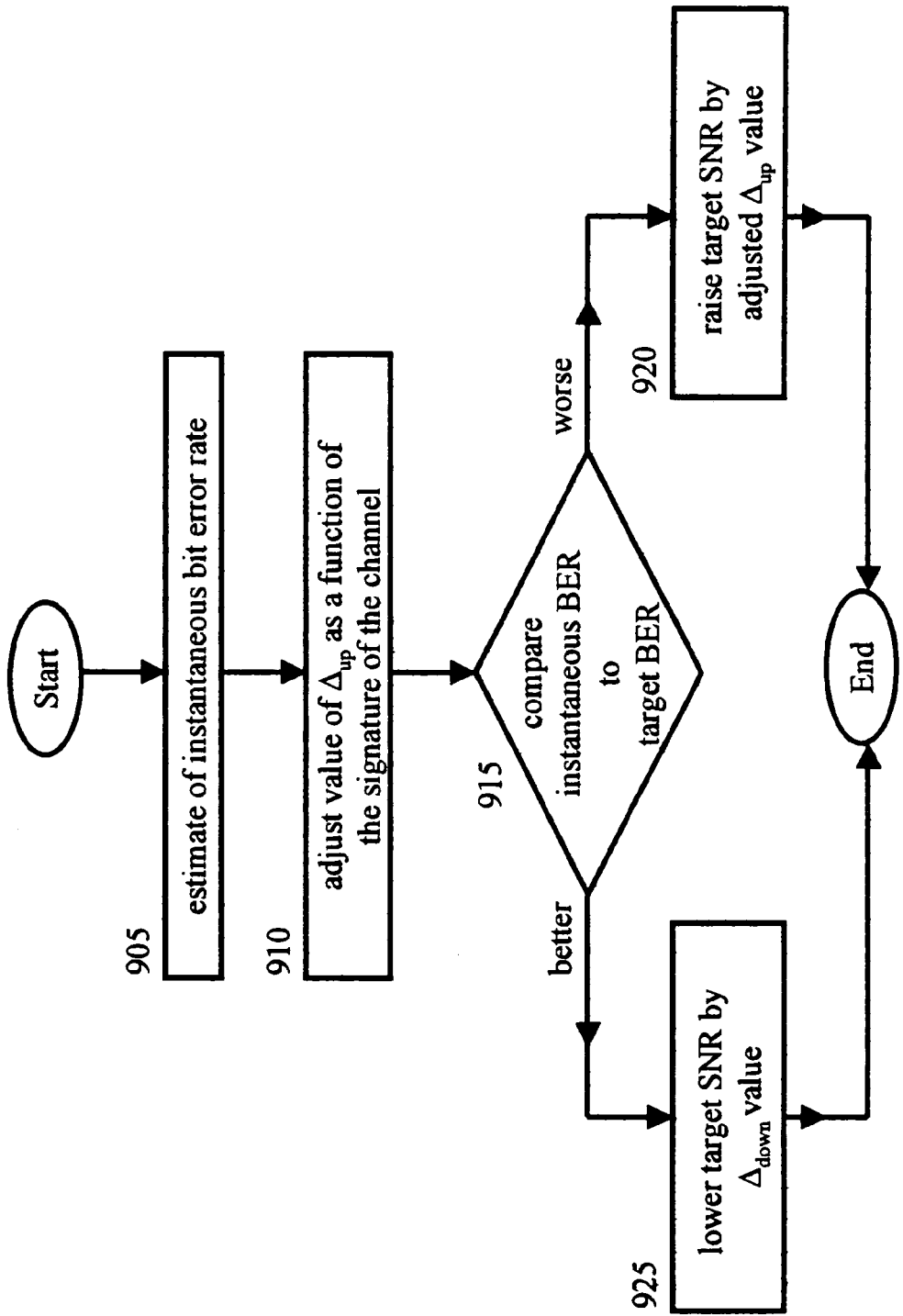

REVERSE LINK OUTER LOOP POWER CONTROL WITH ADAPTIVE COMPENSATION

This is a Continuation-In-Part of application Ser. No. 09/052,696 filed Mar. 31, 1998 now U.S. Pat. No. 6,434,124.

CROSS-REFERENCE TO RELATED APPLICATIONS

Related subject matter is disclosed in the co-pending, commonly assigned, U.S. Patent application of Rege, entitled "A Non-Adaptive Symbol Error Count Based Technique for CDMA Reverse Link Outer Loop Power Control," application Ser. No. 09/052,581, filed on Mar. 31, 1998.

FIELD OF THE INVENTION

This invention relates generally to communications and, more particularly, to wireless systems.

BACKGROUND OF THE INVENTION

Current and emerging standards for commercial wireless communication systems based on the Code Division Multiple Access CDMA technology (e.g. IS-95, CDMA2000, UMTS) include a sophisticated scheme for control of reverse link transmit power. The overall power control scheme for the reverse link is organized in two layers. The inner layer is called Reverse Inner Loop Power Control (RILPC), while the outer layer is called Reverse-link Outer Loop Power Control (ROLPC).

The inner layer, RILPC, typically requires the base station receiver to periodically obtain some measure of the SNR being received on a given connection, compare it with a target SNR and send a one-bit feedback to the mobile transmitter. The mobile transmitter lowers (raises) its transmit power by a fixed amount (in the dB domain) if the feedback bit indicates that the measured SNR was higher (lower) than the target SNR. As such, RILPC performs the task of varying the transmit power level of the mobile in such a manner that the SNR at the base station receiver for a given connection is close to the target SNR.

The outer layer, ROLPC, is responsible for varying the above-mentioned target SNR so that an end-user receives their desired quality metrics. In a prevailing fading environment, the target SNR needs to be adjusted continually to deliver the desired quality metrics to the end-user. Typically, the ROLPC monitors the quality metric to obtain a reliable estimate of the same and then raises or lowers the target SNR depending upon whether the estimate is worse than or better than the target quality metric.

One quality metric is bit error rate (BER), which is a "post-decoding" quality metric, i.e., it requires decoding the received signal. This is referred to herein as "post-decoding BER-based ROLPC." Assuming frame-based transmission, one way of obtaining a BER estimate is to use the log-likelihood ratios for information bits. These log-likelihood ratios are produced by certain decoders as part of the frame decoding process and can be used to estimate an instantaneous BER. The instantaneous BER estimate can be further filtered, or averaged, to obtain a more reliable BER estimate that can be used by ROLPC to adjust the SNR target. Unfortunately, approaches along these lines require strong filtering or averaging over a long period of time, which introduces significant delays in the process of generating BER estimates. Consequently, an ROLPC that uses such techniques to generate BER estimates would be slow to change the target SNR.

An alternative to strong filtering, or averaging over a long period of time, is to use, e.g., the instantaneous BER (generated every frame) or process the instantaneous values through a weak filtering scheme (or average them over a short period of time) before comparing them with the target BER. Such a scheme would be able to quickly change the target SNR.

SUMMARY OF THE INVENTION

We have observed that even in a steady environment where the statistical nature of the signal fluctuations do not change with time, even the use of an instantaneous BER estimate cannot always set the target SNR at a level where the actual average BER is close to the desired BER. This is because, by its nature, this scheme ensures that in a steady state the median value of the instantaneous BER will be close to the target BER. However, in a typical fading environment characterized by wide signal fluctuations, the difference between the mean and median values of BER can be significant, even exceeding an order of magnitude. Moreover, this difference depends on the underlying fading environment, which determines the depth and correlation properties of signal fluctuations in the communications channel. As a consequence, when the desired end-user quality metric is the mean or average BER, this scheme often fails to achieve its objective.

Therefore, and in accordance with the invention, in performing post-decoding based ROLPC, a user metric target is varied as a function of a "signature" of the communications channel.

In an embodiment of the invention, a base station employs an ROLPC technique using post-decoding BER as the user metric target. The ROLPC technique uses either instantaneous or weakly filtered values of BER for comparison with the target BER value for adjusting a target SNR. The target BER value is varied as a function of a second order statistic (e.g. variance, standard deviation) of the received SNR. The second order statistic of the received SNR is representative of a signature of the communications channel.

In another embodiment of the invention, a base station uses a $2^{nd}$ order statistic, e.g., standard deviation (variance), to identify, or act as a signature of, a particular cellular (wireless) communications environment. The signature is used to set a target symbol error rate appropriate for the current environment. The $(E_b/N_0)_T$ target is adjusted as a function of a comparison of the symbol error count with a dynamically adjusted SER target. The base station monitors the standard deviation of the symbol error count of a received signal (transmitted from a mobile station). The $(E_b/N_0)_T$ target is adjusted as a function of the value of the standard deviation. The adjusted $(E_b/N_0)_T$ target is used to provide power control. As a result, the inventive concept provides a technique to control FER in a variety of cellular communications environments and, at the same time, keep the performance benefits of a SER based technique.

BRIEF DESCRIPTION OF THE DRAWING

FIG. 8 shows an illustrative flow chart embodying the principles of the invention; and FIG. 9 shows an illustrative flow chart of another embodiment of the invention.

DETAILED DESCRIPTION

Figure 1:
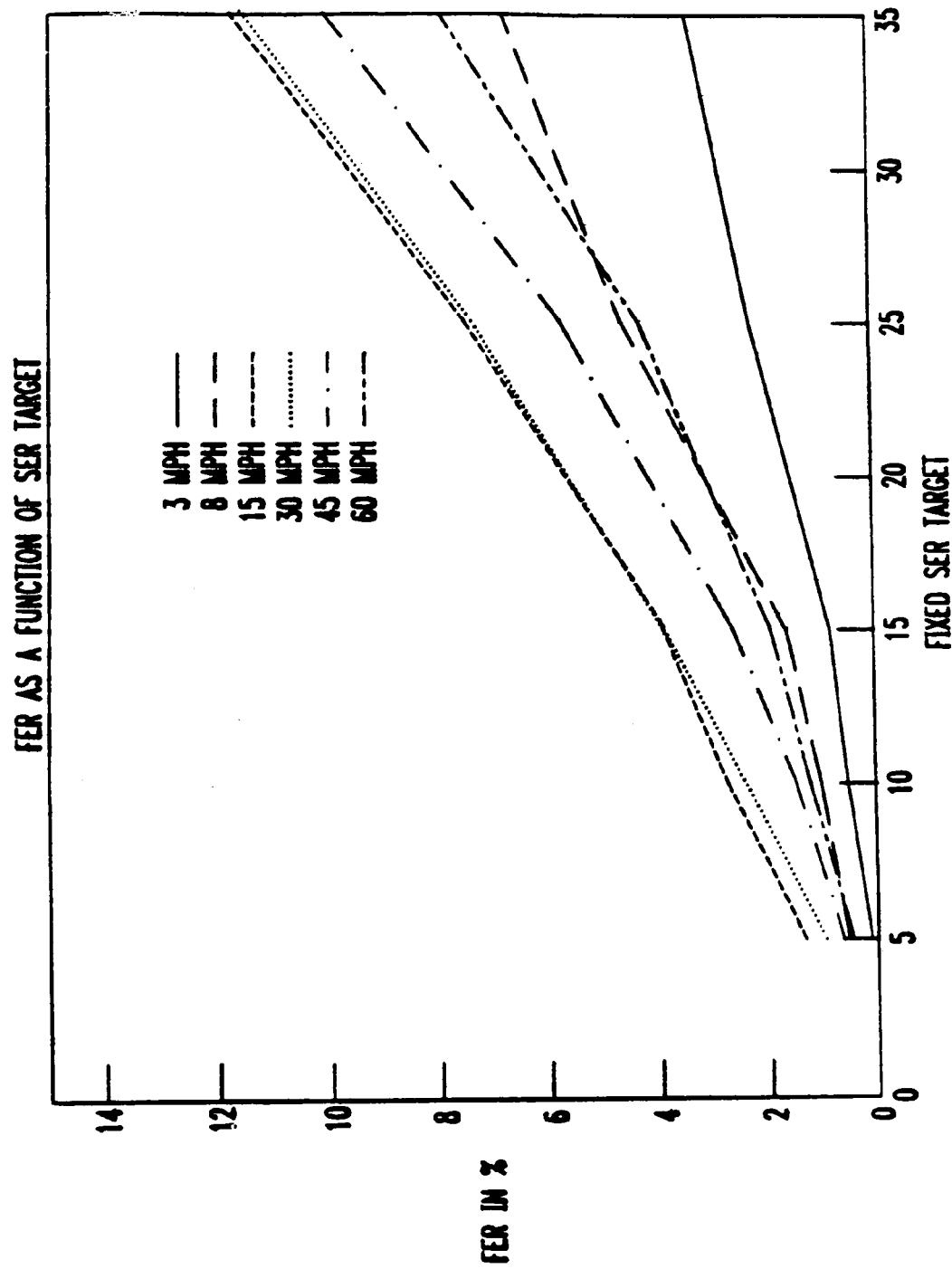
FIGS. 1–3 show simulation results for Fixed SER target ROLPC in different fading environments.

Before describing the inventive concept, a short description of a fixed symbol error rate (SER) target ROLPC technique is provided. Following this section, the performance results of a simulation of the Fixed SER target ROLPC technique is shown upon which the inventive concept is based. After this performance-related section, the inventive concept is presented.

Fixed SER Target ROLPC

The core of this technique, assuming only full rate frames have been received and that no erasures have occurred, is described below. (It should be noted that dealing with partial rate frames and frame erasures leading to the loss of the rate estimate can be done in a number of ways. For example, partial rate frames could use smaller step sizes for making changes in the $(E_b/N_0)_T$ target, and, if the rate information is unavailable because of a frame erasure, the last available rate parameter may be used as an estimate for the current frame rate.)

The following definitions are used:

$T_{SE}$=fixed SER target;

$(T_{E_{bT}/N_{0T}})_n$=the $(E_b/N_0)_T$ target (in dB) for the $n^{th}$ frame;

$\Delta$=the basic full rate step size, also in units of dB;

$A_0=0, A_1, \ldots, A_{K-1}$ and $A_K=\infty$ are a strictly increasing sequence of integers;

$M_1, M_2, \ldots, M_K$ are another sequence of strictly increasing positive weight values;

$SE_n$=the symbol error count generated by the $n^{th}$ frame, which is provided by the receiver portion of the base station;

$E_{max}$=Upper limit on the $(E_b/N_0)_T$ target (in dB);

$E_{min}$=Lower limit on the $(E_b/N_0)_T$ target (in dB); and $d_n, L_n$, are variables, or parameters.

The Fixed SER target ROLPC technique adjusts the $(E_b/N_0)_T$ target in the following manner:

$$d_n = SE_n - T_{SE}; \quad (1)$$

$$\text{sgn}(d_n) = \text{Sign of } d_n; \quad (2)$$

$$\text{if } d_n=0 \text{ then let } L_n=0; \quad (3)$$

$$\text{Else if } A_{k-1} < |d_n| \le A_k \text{ for some k>0, Let } L_n=M_k; \quad (4)$$

$$(T_{E_{bT}/N_{0T}})_{n+1} = (T_{E_{bT}/N_{0T}})_n + \text{sgn}(d_n)L_n\Delta; \quad (5)$$

$$\text{if}((T_{E_{bT}/N_{0T}})_{n+1} > E_{max}, (T_{E_{bT}/N_{0T}})_{n+1} E_{max}; \text{ and} \quad (6)$$

$$\text{if}(T_{E_{bT}/N_{0T}})_{n+1} < E_{min}, (T_{E_{bT}/N_{0T}})_{n-1} = E_{min}. \quad (7)$$

In step (1) of the above technique, initially the variable, $d_n$, is set equal to the difference between the symbol error count generated by the $n^{th}$ frame, $SE_n$, and the target symbol error rate for the $n^{th}$ frame, $T_{SE}$. In step (2), the function sgn($d_n$) is set equal to the sign of the variable, $d_n$. In step (3), if the value of the variable, $d_n$ is equal to zero, then the variable, $L_n$, is also set equal to zero and execution proceeds to step (5), described below. However, if the value of the variable, $d_n$, is not equal to zero, then the magnitude of the variable $d_n$ is compared to a plurality of intervals, $A_k$, in step (4). The parameters $A_0=0, A_1, \ldots, A_{K-1}$ and $A_K=\infty$, define intervals such that if the magnitude of the difference between the actual symbol error count $SE_n$ and the target $T_{SE}$ falls in the, say, $k^{th}$ interval, the variable $L_n$ is set equal to the corresponding weight $M_k$ (illustrative values for these variables are given below). In step (5), the $(E_b/N_0)_T$ target is updated for the next frame, n+1, by adjusting the current $(E_b/N_0)_T$ target by the basic step size $\Delta$ multiplied, as shown, by the value of the variable $L_n$. This allows one to make large or small changes in the $(E_b/N_0)_T$ target depending on the magnitude of the difference between the actual symbol error count and the symbol error target. In steps (6) and (7), the $(E_b/N_0)_T$ target for the next frame is limited by the respective upper and lower limit values.

Performance of Fixed SER Target ROLPC

Figure 2:
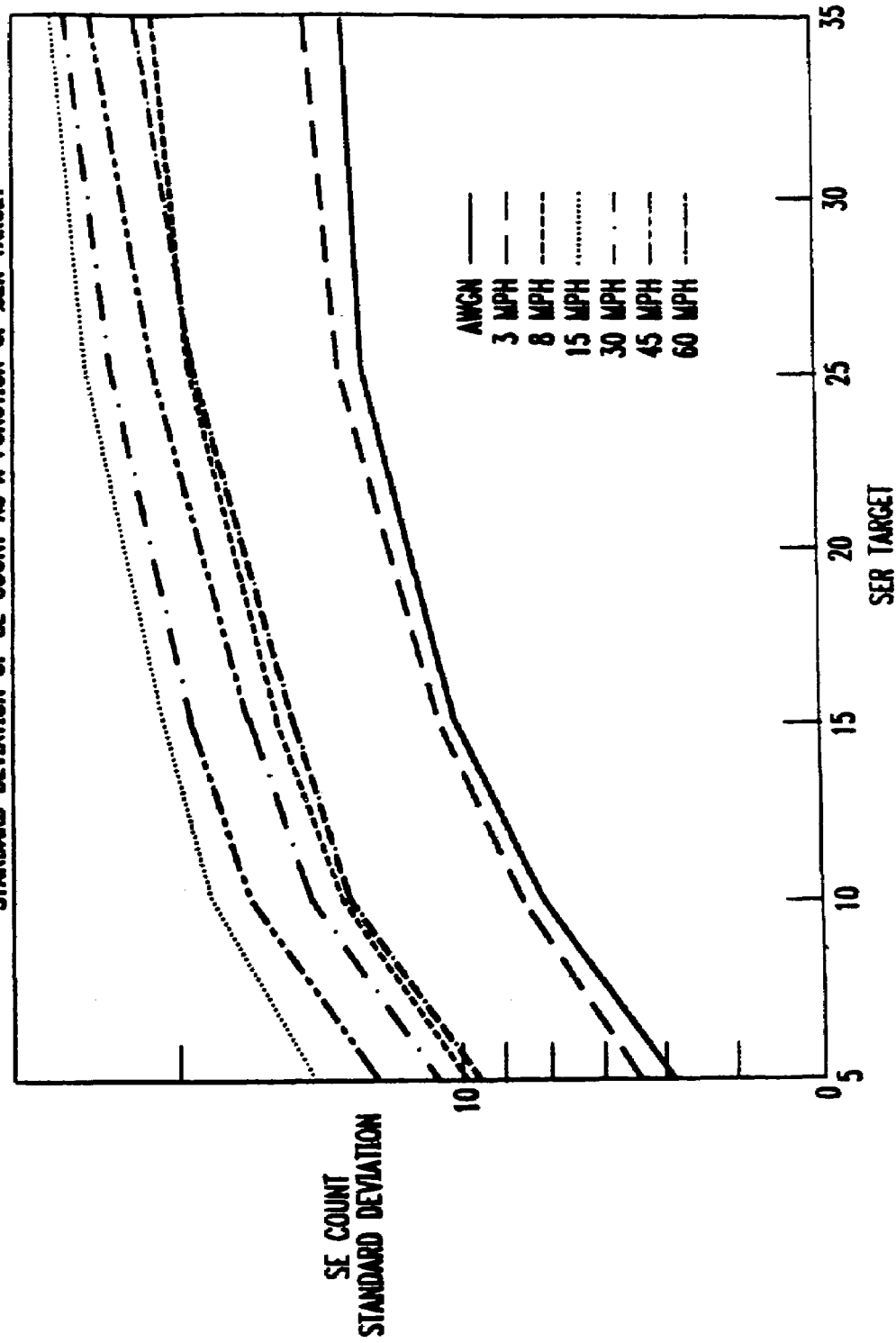
Figure 3:
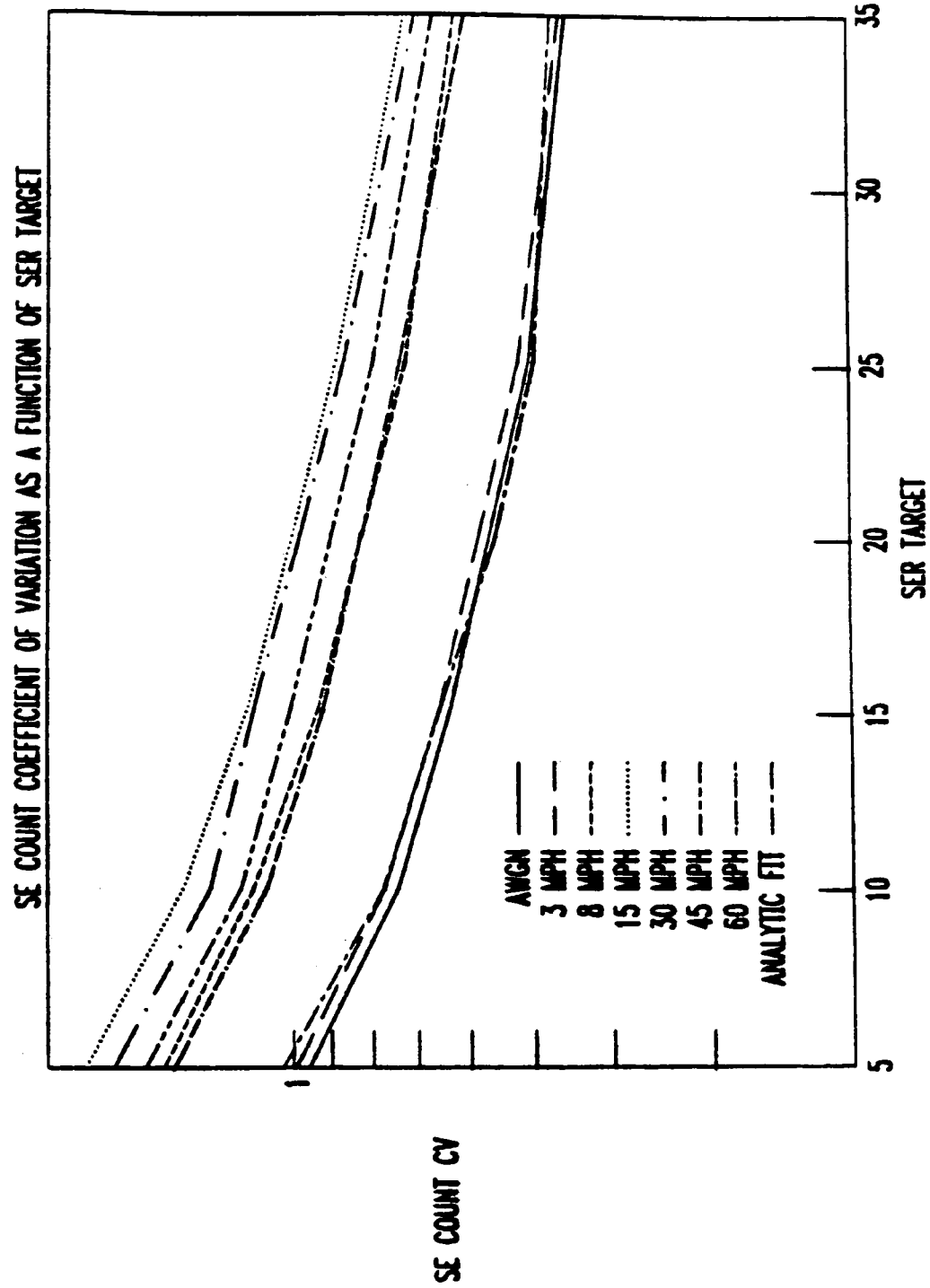

An illustrative set of performance results of a simulation of the Fixed SER target ROLPC technique under different fading conditions and at different values of the (fixed) SER target $T_{SE}$ are shown in FIGS. 1–3. The logarithmic scale has been deliberately used to highlight the variation in these performance metrics.

This simulation used the following set of parameters values:

$A_0=0, A_1=10, A_2=25,$ and $A_3=\infty$;

$M_1=1, M_2=2,$ and $M_3=4$;

$\Delta=0.01$ dB;

$E_{max}=10.5$ dB; and $E_{min}=3$ dB.

And incorporated the following list of assumptions.

The base-station receiver was assumed to be connected to two antennas, each receiving one multipath of the reverse link transmissions, with a RAKE receiver finger, as known in the art, locked to each multipath.

The fading on the two multipaths was assumed to be independent with Rayleigh distribution. Jakes' construction (e.g., see Jakes, W. C., *Microwave Mobile Communications*, Wiley, New York, 1974) was used to generate this fading phenomenon with its speed dependent correlation properties.

All other interference, thermal noise, etc. was modeled as an independent white Gaussian noise process.

A bit (coded symbol) level simulation of the Viterbi decoder/interleaver combination in which the soft decision metrics were generated according to the logic described in Chapter 4 of *"CDMA Principles of Spread Spectrum Communications,"* by A. J. Viterbi, was incorporated into the overall simulation testbed.

Inner loop control was explicitly modeled—the $E_b/N_0$ estimator used in the inner loop was assumed to be perfect. A 5% error rate was assumed on the inner loop feedback bits. The $E_b/N_0$ estimator was assumed to compute the average per antenna $E_b/N_0$ by summing the instantaneous $E_b/N_0$ values for each active RAKE finger and then dividing the sum by 2 in the linear—not dB—domain.

Different fading conditions were created by varying the mobile speed from 3 MPH to 60 MPH. In addition, the AWGN environment was also included in this study for the sake of completeness. The value of the SER target was also varied from 5 to 35 to study the impact of this parameter.

FIG. 1 shows the frame error rate as a function of the (fixed) SER target for different fading environments. From FIG. 1, it can be observed that no single fixed SER target will be able to maintain the frame error rate close to the desired value across the various fading environments considered here. This is because although the SER and FER are strongly correlated with each other, they do not share a nearly deterministic relationship that holds across different fading environments. The reason for this can be traced to the interaction between the inner loop control, the interleaver and the fading environment which gives rise to different symbol error distributions at different mobile speeds. Consequently, even for comparable symbol error rates, different environments can witness widely different frame error rates because of the underlying symbol error distributions.

FIGS. 2 and 3 respectively show the standard deviation of the symbol error count and the coefficient of variation (i.e. the ratio of the standard deviation to the mean) of the symbol error count as functions of the (fixed) SER target for different fading environments. FIGS. 2 and 3 present an intriguing fact: Across the wide range of SER targets considered in this study, the curves depicting the relationship between the standard deviation of SE count (or the coefficient of variation of SE count) and the (fixed) SER target for different fading environments are parallel to each other on a logarithmic scale! That is, the ratios of the standard deviation of SE count corresponding to different fading environments remain constant at all values of the SER target that may be of interest. The same can be said of the coefficient of variation of symbol error count (referred to herein as CV). This happens in spite of the fact that these quantities (standard deviation of SE count or SE count CV) display a wide variation across environments and SER target values. Moreover, it can be observed from FIGS. 1 and 2 (or 1 and 3) that if two fading environments have comparable SE count standard deviation for any fixed SER target, their FER characteristics are also fairly close. Thus, and in accordance with the inventive concept, the SE count standard deviation (or variance or SE count CV) can be used to identify the fading environment so that the SER target can be set at a level likely to achieve the desired FER in that environment. This will ensure that the resulting FER is close to the desired frame error rate. Changes in the fading environment will be reflected in the standard deviation of the SE count, which, in turn, will result in changes in the SER target. (It should be noted that the above-mentioned co-pending, commonly assigned, U.S. Patent application of Rege, entitled "A Non-Adaptive Symbol Error Rate Based Technique for CDMA Reverse Link Outer Loop Power Control," presents an alternative non-adaptive SER based reverse link outer loop power control that also achieves the desired FER under a variety of fading environments.)

An Adaptive SER Based ROLPC

As a result of the above observations on the performance of the Fixed SER target ROLPC approach in different communications environments, a symbol error count based ROLPC technique with adaptive SER targets is presented. As a result, the inventive concept provides an SE count based ROLPC technique that achieves desired FER under different fading conditions.

Figure 4:
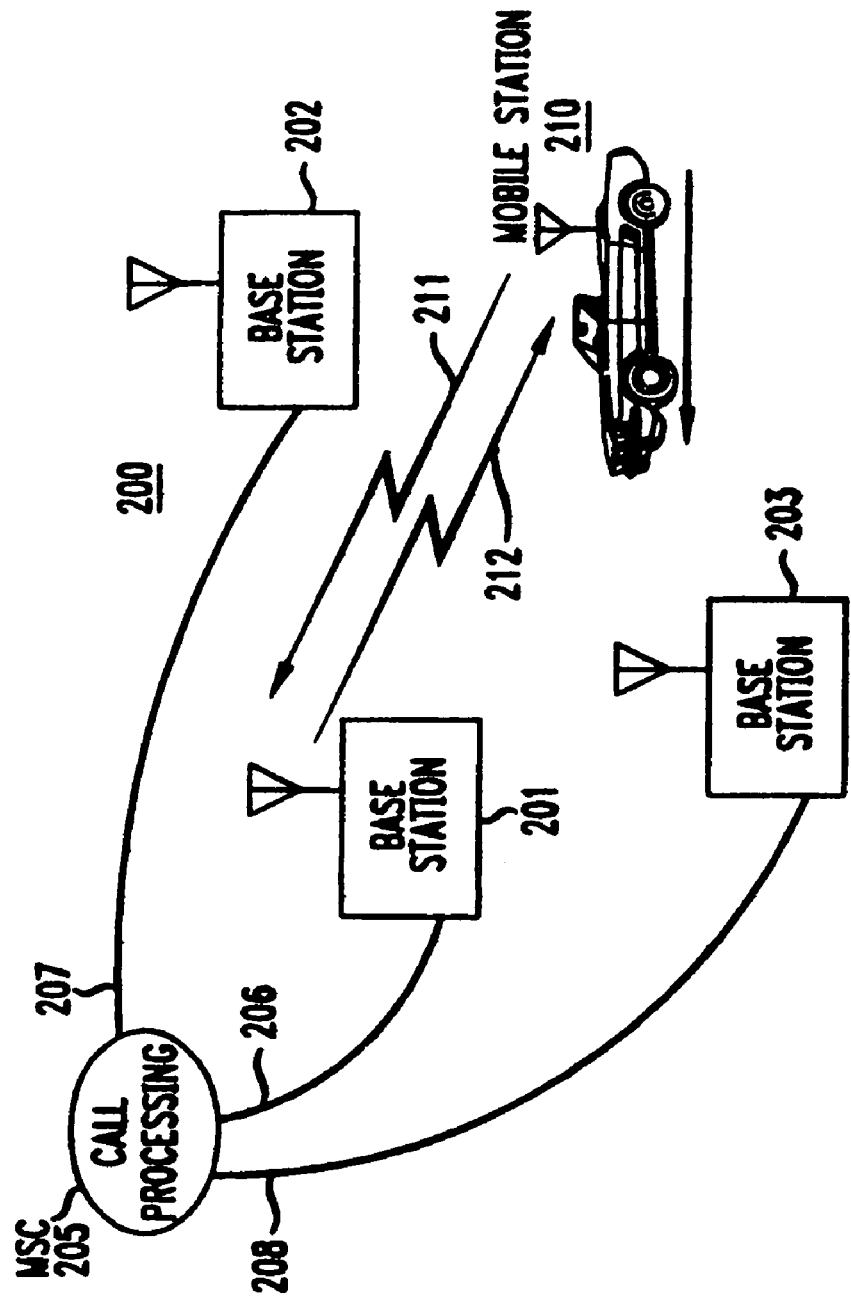
FIG. 4 shows a portion of a mobile communications system embodying the principles of the invention.

Turning now to FIG. 4, a portion of a CDMA mobile communications system 200 embodying the principles of the invention is shown. Other than the inventive concept, the elements shown in FIG. 4 are well-known and will not be described in detail. For example, although shown as a single block element, base station 201 includes stored-program-control processors, memory, and appropriate interface cards. Except as noted below, it is assumed that the CDMA mobile communications system conforms to industry standard IS-95. Portion 200 comprises mobile switching center (MSC 205), which (among other things) provides call processing; three base stations: 201, 202, and 203; and a mobile station 210, which is illustratively represented by a vehicle icon. The three base stations and the mobile station are representative of wireless endpoints. Each base station is coupled to MSC 205 over respective land-line facilities, 206, 207, and 208. For the purposes of the remainder of this description, it is assumed that mobile station 210 is in communications with base station 201, via downlink signal 212 and uplink signal 211.

Figure 5:
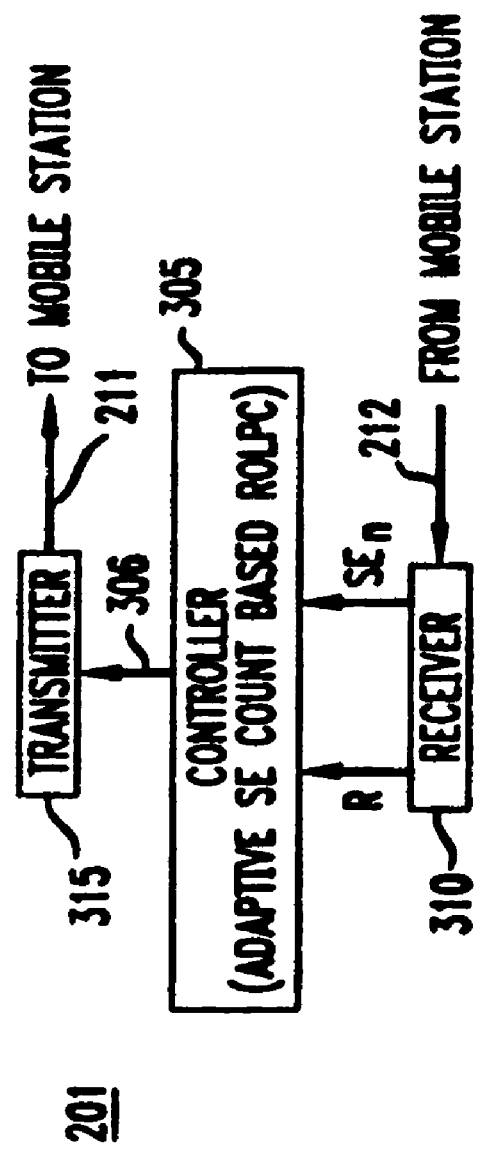
FIG. 5 shows a portion of a base station embodying the principles of the invention.

In accordance with the inventive concept, base station 201 performs adaptive SE count based ROLPC on the received signal 211 from mobile station 210. FIG. 5 shows a portion of base station 201 embodying the principles of the invention. Other than the inventive concept, the elements shown in FIG. 5 are well-known and will not be described in detail. For example, controller 305 is representative of a stored-program-controlled processor with associated memory as known in the art. Also, only that portion of base station 201 related to the inventive concept is shown, e.g., other processing by receiver 310 of the received signal is not described. Base station 201 comprises controller 305 (also referred to herein the base station processor), receiver 310, and transmitter 315. Receiver 310 receives the uplink signal, 211, and provides to controller 305 two signals: R, which is the reciprocal of the rate of the frame just processed by receiver 310 and is equal to 0 if there is an erasure so that the rate information is lost; and $SE_n$, which is the symbol error count generated by the $n^{th}$ frame. In accordance with the Adaptive SE count based ROLPC technique, controller 305 carries out computations to update the symbol error target and the $(E_b/N_0)_T$ target for the next frame after receiver 310 has just finished processing a current frame. Controller 305 also controls transmitter 315 for providing the above-mentioned feedback signal to mobile station 210 for controlling the transmit signal level of mobile station 210. (As noted earlier, when the mobile station receives this feedback signal, the mobile station raises its transmit power by 1 dB or lowers it by 1 dB depending on the value of the feedback bit.)

Before describing the details of the adaptive SE count based ROLPC technique, the core of this approach is described below and shown in FIG. 6. It is assumed that only full rate frames are transmitted and that the rate information is not lost. (As mentioned above, partial rate frames and frame erasures can be handled in a number of ways. For example, partial rate frames could use smaller step sizes for making changes in the $(E_b/N_0)_T$ target, and, if the rate information is unavailable because of a frame erasure, the last available rate parameter may be used as an estimate for the current frame rate.)

The Adaptive SER based ROLPC technique monitors the following additional variables:

$\overline{SER_n}$ = estimated average SER after the $n^{th}$ frame;

$\overline{SER^2_n}$ = estimated average square of SER after the $n^{th}$ frame; and $\overline{T_{SE_n}}$ = estimated average symbol error target after the $n^{th}$ frame.

The following are definitions for some key relationships.

$f(T_{SE})$: A reference symbol error CV characteristic showing the relationship between the symbol error CV and the symbol error target for a fixed environment such as AWGN under the basic control algorithm with a constant SER target. ($f(T_{SE})$ is determined empirically or analytically.)

$S_{ref}$: The SER target which achieves the desired FER under the reference environment used in the determination of $f(T_{SE})$ using the basic control algorithm with a constant SER target. This is also determined empirically and stored.

$g(x)$: Another empirically determined relationship between the ratio of the target SERs that achieve the desired FER under two fading environments and the ratio of the corresponding SE count CVs. That is, if $T_1$ and $T_2$ are SER targets that achieve the desired FER under environments 1 and 2 respectively, and if $CV_1$ and $CV_2$ are the corresponding SE count CV values, then $g(.)$ represents the relationship:

$$\frac{T_1}{T_2} = g\left(\frac{CV_1}{CV_2}\right).$$

This relationship may be determined using regression techniques. To determine this relationship one may use the reference environment as environment 2 and then substitute different fading environments for environment 1 to obtain different points of this curve. The above relationship may then be written as:

$$\frac{T_1}{S_{ref}} = g\left(\frac{CV_1}{CV_{ref}}\right),$$

where $CV_{ref}$ is the symbol error CV under the reference environment when the fixed SER target is set at $S_{ref}$.

Figure 6:
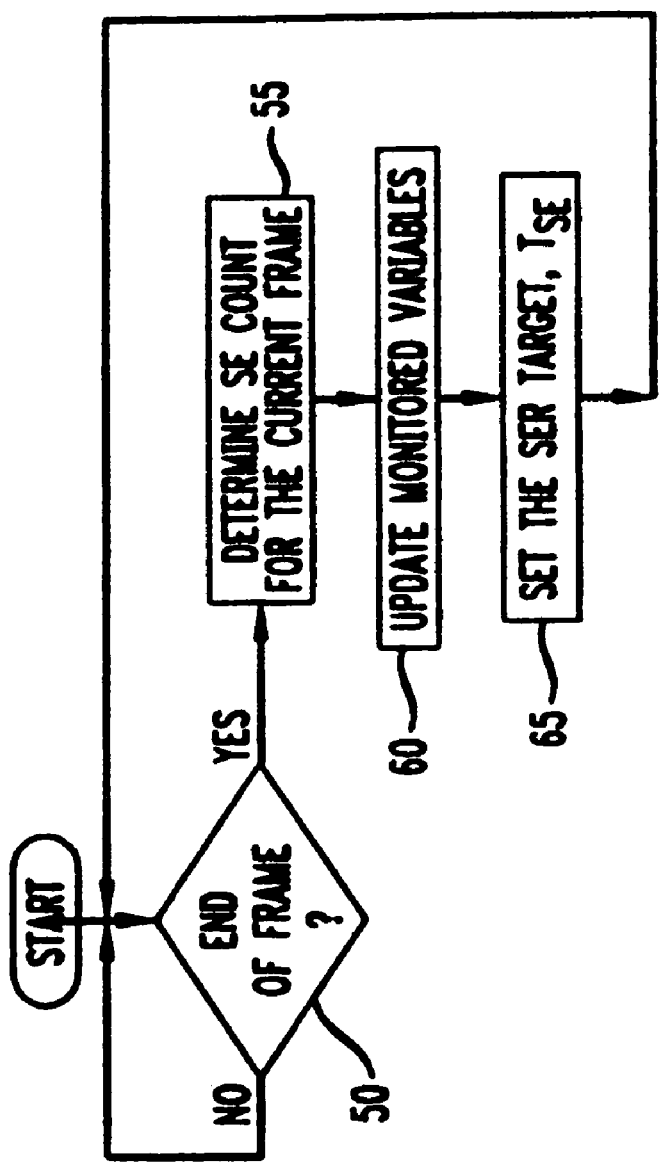
FIG. 6 shows an illustrative flow chart embodying the principles of the invention.

Referring to FIG. 6, an illustrative high-level representation of an adaptive SE count based ROLPC process is shown in accordance with the principles of the invention. In step 50, the adaptive SE count based ROLPC process waits for the end of every frame (e.g., that the $n^{th}$ frame has just ended). At the end of every frame, the resulting symbol error count, $SE_n$, is determined in step 55, by e.g., receiver 310 of FIG. 5. In step 60, the values of the above-described monitored variables are updated by, e.g., controller 305 of FIG. 5, as a function of the symbol error count, $SE_n$. In step 60, the following equations are used by controller 305 to carry out these updates:

$$\overline{SER_n} = (1-\alpha)\overline{SER_{n-1}} + \alpha SE_n;$$

$$\overline{SER^2_n} = (1-\alpha)\overline{SER^2_{n-1}} + \alpha SE^2_n; \text{ and}$$

$$\overline{T_{SE_n}} = (1-\alpha)\overline{T_{SE_{n-1}}} + \alpha T_{SE_n};$$

where $\alpha$ is a suitable filter constant, e.g., 0.2. (The above equations are simple single-pole IIR (infinite impulse response) filters used to derive estimates of the corresponding averages. Other averaging techniques can also be used in place of these filter equations.)

In accordance with the inventive concept, in step 65 the SER target, $T_{SE}$, is set using the updated monitored variables. The new SER target thus set is used for the SER comparison for the next frame. In step 65, the following equations are used to set the value of the SER target, $T_{SE}$, in accordance with the inventive concept:

$$\overline{CV_n} = \frac{\sqrt{\overline{SER^2_n} - (\overline{SER_n})^2}}{\overline{SER_n}}, \text{ and}$$

$$T_{SE_{n+1}} = S_{ref} g(\overline{CV_n}/f(\overline{T_{SE_n}})).$$

To prevent wild variations of the symbol error target, upper and lower limits, $S_{max}$ and $S_{min}$, may be placed on $T_{SE}$ (shown below). Similarly, the estimate $\overline{CV_n}$ may be bounded to limit its fluctuation.

The technique described above uses the coefficient of variation of the symbol error count to set the symbol error target. It should be noted that a similar scheme can be devised for setting the SE target using the standard deviation or the variance of the symbol error count.

Having described the general concept, an illustrative detailed description of an adaptive SER based ROLPC technique in accordance with the principles of the invention is now presented. The following definitions are used (some of these definitions are similar to those used in the above-described Fixed SER target ROLPC technique and are repeated here for convenience):

$S_{max}$=Upper limit on the symbol error target;
$S_{min}$=Lower limit on the symbol error target;
FER_target=Desired frame error rate;
$E_{nom}$=Nominal value of the $(E_b/N_0)_T$ target (in dB);
$S_{nom}$=Nominal value of the symbol error target;
$CV_{nom}$=Nominal value of the coefficient of variation of the SE count;
$E_{max}$=Upper limit on the $(E_b/N_0)_T$ target (in dB);
$E_{min}$=Lower limit on the $(E_b/N_0)_T$ target (in dB);
$A_0, A_1, \ldots, A_K$: K+1 integers arranged in an ascending order (to define symbol error intervals) with $A_0=0$, and $A_K=\infty$;
$M_1, M_2, \ldots, M_K$: K positive weight values arranged in an ascending order;
$\beta_1, \beta_2, \beta_4, \beta_8$: De-emphasis factors for frame rates 1, ½, ¼ and ⅛ respectively, with $\beta_1=1$;
$\Delta$: Basic step size (in dB) for changes in the $(E_b/N_0)_T$ target;
$\delta_1, \delta_2, \delta_4, \delta_8$: Step sizes (in dB) in case of frame erasures when the last good frame rate is 1, ½, ¼ and ⅛, respectively;
$\alpha$: IIR filter constant;
$f(T_{SE})$: The empirically determined relationship between the coefficient of variation of symbol error count and the SER target under a fixed reference environment such as AWGN with the fixed SER target algorithm being used for ROLPC;
$g(x, \text{FER\_target})$: Another empirically determined relationship between the ratio of SE targets that achieve FER_target in different environments and x, the ratio of corresponding SE CVs, for each given FER target; For a given FER target (equal to FER_target), $g(x, \text{FER\_target})$ represents the empirically determined relationship between the ratio of SE targets (in two different fading environments) that achieve the FER_target and the corresponding ratio of the symbol CVs (in those two environments).
$S_{ref}(\text{FER\_target})$: Another empirically determined relationship showing the symbol error target at which the basic fixed SER target algorithm achieves the FER_target under the reference environment;
$T_{SE}$=Symbol error target;
$(T_{E_{bT}/N_0T})$= the $(E_b/N_0)_T$ target (in dB) for the $n^{th}$ frame;

Last_good_rate=The speech rate of the last frame received without an erasure;

d, L, are variables, or parameters;

$\overline{SER_n}$=estimated average SER after the $n^{th}$ frame;

$\overline{SER^2_n}$=estimated average square of SER after the $n^{th}$ frame; and $\overline{T_{SE_n}}$=estimated average symbol error target after the $n^{th}$ frame.

The following signal values are supplied by the receiver of the base station:

R=The reciprocal of the rate of the frame just processed and is equal to 0 if there is an erasure so that the rate information is lost; and $SE_n$=the symbol error count generated by the $n^{th}$ frame.

The following initialization is performed:

$T_{E_b/N_0}=E_{nom}$;

$\overline{T_{SE_n}}=S_{nom}$;

$\overline{SER_n}=S_{nom}$;

$\overline{SER^2_n}=(S_{nom})^2(1+CV^2_{nom})$; and

Last_good_rate=1.

In accordance with the Adaptive SE count based ROLPC technique, the base station processor carries out the computations shown below to update the symbol error target and the $(E_b/N_0)_T$ target after the base station receiver has just finished processing a frame (and provided current values for R and $SE_n$). It should be noted that for simplicity, the subscript n, representing the nth frame has been dropped from some of the variables, e.g., the variable $SE_n$ is shown as SE.

If R>0; (100)

{

SE←SE×R; (101)

$d=SE-T_{SE}$; (102)

sgn(d)=sign of d; (103)

If d=0, let L=0; (104)

Else {find k such that $A_{k-1}<|d|\leq A_k$, let L=$M_k$;} (105)

$T_{E_b/N_0}\leftarrow T_{E_b/N_0}+\text{sgn}(d)L_n\Delta/\beta_R$; (106)

$\overline{SER}\leftarrow(1-\alpha/\beta_R)\overline{SER}+(\alpha/\beta_R)SE$; (107)

$\overline{SER^2}\leftarrow(1-\alpha/\beta_R)\overline{SER^2}+(\alpha/\beta_R)SE^2$; (108)

$\overline{T_{SE_n}}\leftarrow(1-\alpha/\beta_R)\overline{T_{SE_n}}+(\alpha/\beta_R)T_{SE}$; (109)

$$\overline{CV}=\frac{\sqrt{\overline{SER^2}-(\overline{SER})^2}}{\overline{SER}};$$ (110)

$T_{SE}=S_{ref}(FER\_target)g(\overline{CV}/f(\overline{T_{SE}}), FER\_target)$; (111)

if $T_{SE}>S_{min}$, $T_{SE}=S_{max}$; (112)

if $T_{SE}<S_{min}$, $T_{SE}=S_{min}$; (113)

Last_good_rate=R; (114)

}

Else (i.e., if R equals 0 because of frame erasure)

{

R=Last_good_rate (115)

$T_{E_b/N_0}\leftarrow T_{E_b/N_0}+\delta_R$; (116)

}

If $T_{E_b/N_0}>E_{max}$, $T_{E_b/N_0}=E_{max}$; (117)

If $T_{E_b/N_0}<E_{min}$, $T_{E_b/N_0}=E_{min}$; (118)

In step (100) of the above technique, the value of R, received from the base station receiver, is evaluated. A value of R greater than zero is representative of no erasure of the current received frame, while a value of R equal to zero indicates an erasure has occurred. If the value of R is equal to zero, then steps (115) and (116) are performed. In this case, the value of R is set equal to the value of the variable Last_good_rate in step (115). In step (116), the value of the $(E_b/N_0)_T$ target is updated for the next frame, n+1, by adjusting the current $(E_b/N_0)_T$ target by $\delta_R$ (as noted above, these are $\delta_1$, $\delta_2$, $\delta_4$, $\delta_8$, where R is either 1, 2, 4, or 8). Execution proceeds with step (117), described below. However, if at step (100) the value of R is greater than zero, steps (101) through (114) are performed.

In step (101), the symbol error count, SE, for the current frame is multiplied by the value of R to provide an adjusted value for the symbol error count, SE. In step (102), the variable, d, is set equal to the difference between the value of SE and the target symbol error count for the $n^{th}$ frame, $T_{SE}$. In step (103), the function sgn(d) is set equal to the sign of the variable, d. In step (104), if the value of the variable, d, is equal to zero, then the variable, L, is also set equal to zero and execution proceeds to step (106), described below. However, if the value of the variable, d, is not equal to zero, then the magnitude of the variable d is compared to a plurality of intervals, $A_k$, in step (105). The parameters $A_0=0$, $A_1$, ..., $A_{K-1}$ and $A_K=\infty$, define intervals such that if the magnitude of the difference between the actual symbol error count SE and the target $T_{SE}$ falls in the, say, $k^{th}$ interval, the variable L is set equal to the corresponding weight $M_k$. In step (106), the $(E_b/N_0)_T$ target is updated for the next frame, n+1, by adjusting the current $(E_b/N_0)_T$ target by the basic step size $\Delta$ multiplied, as shown, by the value of the variables L and divided by the value of the de-emphasis factor $\beta_R$ (as noted above, these are $\beta_1$, $\beta_2$, $\beta_4$, $\beta_8$, where R is either 1, 2, 4, or 8). Steps (107), (108) and (109) update the above-described monitored variables. Steps (110) and (111) set the value of the SE count target, $T_{SE}$, in accordance with the inventive concept. In steps (112) and (113), the SE count target, $T_{SE}$, is limited by the respective maximum and minimum values. In step (114), the value of the variable Last_good_rate is set equal to the value of R.

In steps (117) and (118), the $(E_b/N_0)_T$ target for the next frame is limited by the respective upper and lower limit values.

Performance of Adaptive SER Based ROLPC

Simulation results are presented to show how effectively the SE count based ROLPC with adaptive SER targets performs in different environments. Again, it should be noted that in these simulations full rate frames alone are used and that it is assumed that the rate information is never lost because of erasures. The same set of fading environments that were used to study the performance of the basic algorithm with a constant SER target are assumed. The parameters of the adaptive algorithm used in the simulation runs were as follows:

$S_{max}$=Upper limit on the SE count target, e.g., 30 (number of symbol errors/frame);

$S_{min}$=Lower limit on the SE count target, e.g., 5;

FER_target=Desired frame error rate, e.g., 1%;

$E_{nom}$=Nominal value of the $(E_b/N_0)_T$ target (in dB), e.g., 5 dB;

$S_{nom}$=Nominal value of the SER target, e.g., 15;

$CV_{nom}$=Nominal value of the SER coefficient of variation, e.g., 0.5;

$E_{max}$=Upper limit on the $(E_b/N_0)_T$ target (in dB), e.g., 10.5 dB;

$E_{min}$=Lower limit on the $(E_b/N_0)_T$ target (in dB), e.g., 3 dB;

$A_0=0$, $A_1=10$, $A_2=25$, and $A_3=\infty$;

$M_1=1$, $M_2=2$, and $M_3=4$;

$\beta_1, \beta_2, \beta_4, \beta_8$: De-emphasis factors for frame rates 1, ½, ¼ and ⅛ respectively, with $\beta_1=1$;

$\Delta$: Basic step size (in dB) for changes in the $(E_b/N_0)_T$ target, e.g., 0.05 dB;

$\delta_1, \delta_2, \delta_4, \delta_8$: Step sizes (in dB) in case of frame erasures when the last good frame rate is 1, ½, ¼ and ⅛, respectively;

$\alpha$: IIR filter constant, e.g., 0.2;

$f(T_{SE})$: was determined by fitting an analytic curve to the relationship between the symbol CV and the SER target for the AWGN environment obtained from the earlier set of runs made with the basic control algorithm. In this simulation, an illustrative value is:

$f(x)=10^{(5.0-x)\times(0.0152+(0.00045\times(25.0-x)))}$.

g(x, FER_target): was approximated by the by the function:

$g(y,1)=1y^2$ $S_{ref}$(FER_target): was approximated by the by the function $S_{ref}(0.01)=17$. (Or, equivalently, $S_{ref}(1\%)=17$.)

Table 1, below, shows the performance of the proposed SER based algorithm under a variety of fading conditions caused by different mobile speeds.

TABLE 1

Performance of the New SER Based Power Control Algorithm

| Speed (Mph) | FER (%) | Mean $E_b/N_0$ (dB) | Mean Target $E_b/N_0$ (dB) | Mean #SE per Frame | Std. Dev. | CV of SER |
|---|---|---|---|---|---|---|
| 3 | 0.96 | 4.1 | 3.79 | 19.7 | 11.9 | 0.60 |
| 8 | 1.4 | 4.98 | 4.51 | 14.0 | 14.9 | 1.06 |
| 15 | 2.16 | 6.68 | 5.65 | 11.1 | 17.0 | 1.53 |
| 30 | 1.64 | 10.1 | 8.75 | 9.86 | 14.5 | 1.47 |
| 45 | 1.22 | 10.1 | 8.72 | 10.7 | 13.5 | 1.26 |
| 60 | 1.26 | 9.04 | 7.88 | 1.21 | 13.0 | 1.07 |

Table 1 above shows the FER ranging between the narrow range of 1% and 2.2% for the fading environments considered. Thus, indicating that the proposed SE count based algorithm with adaptive SER targets does an admirable job of controlling the FER under widely varying fading conditions. Moreover, its speed is limited only by the speed of the IIR (infinite impulse response) filter used for variable monitoring. When the filter constant, $\alpha$, is at 0.2, the time constant associated with these filters is around 100 ms (milli-seconds) which should provide adequate speed for environment tracking. As such, the proposed technique with adaptive SER targets can control the FER very well without being encumbered by a slow tracking speed as the FER based ROLPC. It should be noted that, in effect, the Adaptive SE count Based ROLPC approach uses the coefficient of variation of the SE count as a "signature" of the environment and uses this signature to set the SER target appropriately. Similar schemes which use the standard deviation or the variance of the SER as signatures of the environment are also possible.

Other variations are also possible. For example, in the example above, it was assumed that the mobile station is communicating with a single base station. However, when the mobile station is in soft-handoff (communicating with multiple base stations), the symbol error count based control described herein may be performed within MSC 205. In particular, MSC 205 receives received frame information (including symbol error count) from each base station involved in soft-handoff with the mobile station. As known in the art, MSC 205 comprises a frame handler (not shown). The frame handler selects the received frame that has the best quality according to some predetermined criterion. (As just one simple example, the frame with the lowest symbol error count. However, other criteria can be used.) MSC 205 then performs the above-described a symbol error count based ROLPC technique with adaptive SER targets using the selected frame and transmits the results back to the base stations. As yet another alternative, each base station can perform its own SE count based control, in accordance with the principles of the invention, using their respective received frames.

An Adaptive BER Based ROLPC

Figure 7:
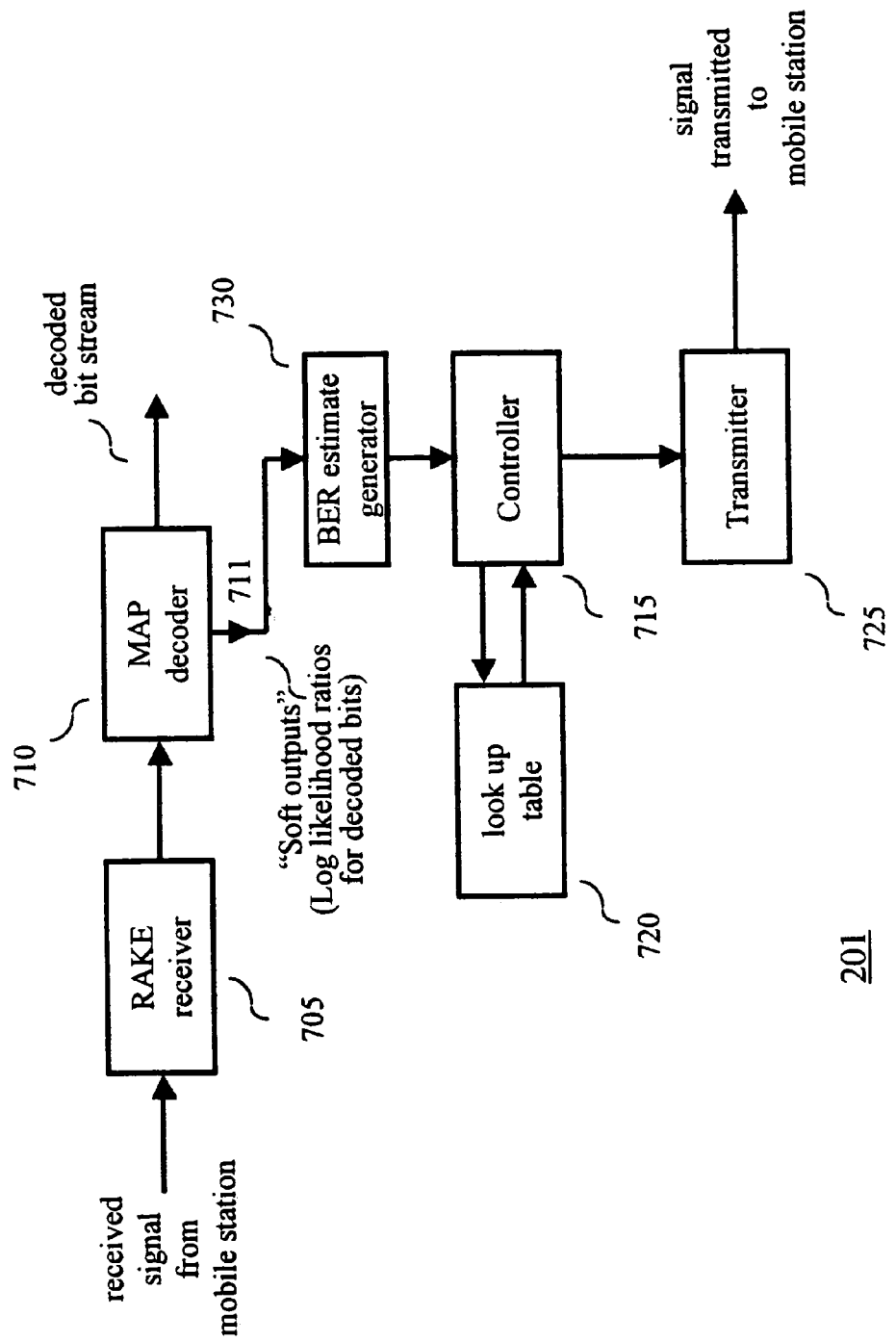
FIG. 7 shows a portion of a base station embodying the principles of the invention.

FIG. 7 shows another embodiment of the invention. Other than the inventive concept, the elements shown in FIG. 7 are well-known and will not be described in detail. For example, controller 715 is representative of a stored-program-controlled processor with associated memory (not shown, except for look-up table 720) as known in the art. Also, only that portion of base station 201 related to the inventive concept is shown, e.g., other processing by base station 201 of the received signal is not described. Further, a detailed description of the receiving and demodulation of a wireless signal is not necessary for the inventive concept and, as such, has been simplified. (For example, the received signal must also be de-interleaved. However, this is assumed to be a part of the MAP decoder and is not described herein.)

Base station 201 comprises RAKE receiver 705, MAP (Maximum A-posteriori Probability) decoder 710, BER estimate generator 730, controller 715, look-up table 720 and transmitter 725. RAKE receiver 705 receives the uplink signal for demodulation and provides a symbol stream to MAP decoder 710. (Alternatively, a Log-MAP, or soft output Viterbi (SOVA) decoder can also be used, as is known in the art.) MAP decoder 710 produces a stream of "soft outputs" 711 associated with the information bits of the received frame. The soft output, $\Lambda_i$, associated with information bit, i, is the log-likelihood ratio associated with it. That is:

$$\Lambda_i = \log_e \frac{P(\text{Bit } i = 1|\underline{y})}{P(\text{Bit } i = 0|\underline{y})}, \quad (8)$$

where P(Bit i=1|$\underline{y}$) denotes the probability that bit 0 equals 1 given that the channel output for the appropriate frame was $\underline{y}$. Similarly, P(Bit i=0|$\underline{y}$) denotes the probability that bit i=0 given that the channel output for the appropriate frame was $\underline{y}$. BER estimate generator 730 takes the soft outputs 711 associated with all the information bits in a frame and produces a BER estimate for that frame. This may be done as follows. From the soft output, $\Lambda_i$, associated with information bit i, BER estimate generator 730 calculates $P_i$, the probability of error for bit i, using the relationship:

$$P_i = \frac{1}{e^{\Lambda_i}+1}, \quad \text{if } \Lambda_i \geq 0; \text{ and} \tag{9a}$$

$$P_i = \frac{e^{\Lambda_i}}{e^{\Lambda_i}+1}, \quad \text{if } \Lambda_i < 0. \tag{9b}$$

The information bit error probabilities are averaged over a frame to produce the bit error rate estimate, BER-I, for that frame. As described further below, controller 715 performs bit error rate based ROLPC with adaptive compensation and adjusts a target SNR, $(E_b/N_0)_T$, for use in the ROLPC. In particular, controller 715 determines the standard deviation of the measured SNR ($E_b/N_0$), $\sigma_{Eb/N0}$, and uses the value of $\sigma_{Eb/N0}$ to retrieve an adjustment value, $\Delta$, from look-up table 720. Controller 715 uses the adjustment value, $\Delta$, to adjust the target BER and then performs ROLPC. Controller 715 controls transmitter 725 for providing the earlier-described RILPC feedback signal to mobile station 210 for controlling the transmit signal level of mobile station 210. (As noted earlier, when the mobile station receives this feedback signal, the mobile transmitter lowers (raises) its transmit power by a fixed amount (in the dB domain) if the feedback bit indicates that the measured SNR ($E_b/N_0$) was higher (lower) than the target SNR.)

In the discussion so far, the units for the quantity BER was assumed to be expressed in its normal units. In the illustrative method described below, the quantity BER is expressed in dB units, which are often more convenient in wireless applications. An illustrative method for use by controller 715 for performing bit error rate based ROLPC with adaptive compensation is shown in FIG. 8. As will become apparent from the description below, the method shown in FIG. 8 is capable of implementation using conventional programming techniques, which as such, will not be described herein. It is assumed that an initial target BER value (BER-$T_I$) is established a priori in base station 201. For example, each user may have their own service profile in the network. During connection setup, mobile station 210 asks for a specific QoS, e.g., a particular BER (i.e., BER-$T_I$). This target BER may depend on the nature of the call (e.g., whether the connection is to transport voice, low constrained delay data, etc.) and, as such, may vary from connection to connection. (Alternatively, the user may request a particular QoS, which the network translates into a target BER based upon current traffic demands.)

In step 805, it is assumed that BER estimate generator 730 forms an estimate of the instantaneous BER (BER-I) once for every received frame (as described earlier) and passes it to controller 715. In step 810, controller 715 performs adaptive compensation of a target BER as a function of the communications channel characteristics and determines an adjusted value of the target BER, i.e., BER-$T_C$. Illustratively, controller 715 determines the standard deviation of the measured SNR ($E_b/N_0$), $\sigma_{Eb/N0}$, and uses the value of $\sigma_{Eb/N0}$ to retrieve an adjustment value, $\Delta$, from look-up table 720. Controller 715 uses the adjustment value, $\Delta$, to determine BER-$T_C$. In step 815, controller 715 compares the value of BER-I to the value of BER-$T_c$. If the value of BER-I is worse than the value of BER-$T_c$, the target SNR is raised in step 820, e.g., by $\Delta_{SNR}$. Alternatively, if the value of BER-I is better than the value of BER-$T_c$, the target SNR is lowered in step 825, e.g., by $\Delta$SNR.

As noted above, in step 810 of FIG. 8, controller 715 performs adaptive compensation of a target BER as a function of the characteristics of the communications channel. Step 810 is performed because we have realized that the difference between the median and mean values of BER depends on the underlying fading environment and, as such, the compensation needs to be adaptively varied. In particular, a second order statistic (e.g. variance, standard deviation) of the signal-to-noise ratio ($E_b/N_0$) (in dB) at the base station receiver is used for the concerned connection as a "signature" of the underlying fading environment (also referred to herein as the "communications channel characteristics" or "communications channel signature"). (The "concerned connection" is, e.g., the current call between mobile station 210 and base station 201 as illustrated in FIG. 4.) The amount of compensation to the initial target BER value is then selected in accordance with this signature. The following is a more detailed description of how to perform adaptive compensation of a target BER as a function of the communications channel signature.

The following definitions are now made (some of which were mentioned above):

BER-$T_C$—the adjusted, or compensated, target bit error rate (in dB);

BER-$T_I$—the initial value of the target bit error rate (in dB);

$\Delta$—the adjustment value, i.e., the amount of compensation added to BER-$T_I$;

BER-T—current target bit error rate (in dB);

BER-I—the estimate of the instantaneous bit error rate (in dB);

SNR-T—the signal-to-noise ratio target that is set by the ROLPC and used by the RILPC;

$\Delta_{SNR}$—the amount in dB by which the SNR target is adjusted after each comparison between BER-I and BER-$T_c$;

$E_b/N_0$—denotes the measured, instantaneous, value of the signal-to-noise ratio at the base station receiver for the concerned connection (in dB);

avg($E_b/N_0$)—the average, or mean value, of $E_b/N_0$ over a period of time;

avg($[E_b/N_0]^2$)—the average, or mean value, of the square of $E_b/N_0$ over a period of time; and $\sigma_{Eb/N0}$—the standard deviation of $E_b/N_0$.

It is assumed that

SNR-T is set at the beginning of every frame and is held constant for the duration of that frame; and $E_b/N_0$ is measured periodically, e.g., N times every frame, for the concerned connection (for IS-95 and UMTS systems N equals 16).

The value of $\sigma_{Eb/N0}$ is illustratively evaluated anew every frame as follows. The measured $E_b/N_0$ is filtered through an infinite impulse response (IIR) filter (not shown) to obtain an estimate of the current mean value of $E_b/N_0$, i.e., avg($E_b/N_0$). Similarly, suitable IIR filtering of the square of the $E_b/N_0$ values provides an estimate of the current mean value of the square of $[E_b/N_0]^2$, i.e., avg($[E_b/N_0]^2$). (IIR filtering is known in the art and is not described herein). (In other words, Then, $\sigma_{Eb/N0}$ is given by:

$$\sigma_{Eb/N0} = \sqrt{\text{avg}([E_b/N_0]^2) - (\text{avg}(E_b/N_0))^2}. \tag{10}$$

As can be observed from the definitions above, the target BER set in step 810 of FIG. 8 is equal to:

$$\text{BER-}T_C = \text{BER-}T_I - \Delta; \text{ where} \tag{11}$$

$$\Delta = f(\sigma_{Eb/N0}). \tag{12}$$

As shown in FIG. 7, one illustrative way to implement equation (12) is simply to use a look-up table, which maps values of $\sigma_{Eb/N0}$ to associated values of the adjustment value, Δ. (Alternatively, a real-time method can be employed, e.g., evaluation of an equation.)

Values for the above-mentioned look-up table (i.e., the mapping of the relationship between Δ and $\sigma_{Eb/N0}$) can be determined a priori either analytically or via simulations. For example, with respect to a simulation, different fading environments are characterized by Doppler frequency, and the number and relative strengths of multipaths. For each fading environment, different fixed BER target levels are used in conjunction with the ROLPC to determine the resulting average value of the BER and $\sigma_{Eb/N0}$. From this exercise, for each fading environment the BER target value for which the average value of BER was closest to BER-T is determined. As defined above, Δ denotes the difference (in dB) between this BER target value and BER-T. In addition, the corresponding value of the standard deviation of $\sigma_{Eb/N0}$ is noted. Next, a scatter-plot of these values of Δ and the corresponding values of $\sigma_{Eb/N0}$ is created. Using suitable curve-fitting techniques, the relationship between $\sigma_{Eb/N0}$ and Δ is obtained (equation (12)) and from which either look-up table entries can be generated; or an equation, which can be calculated in real-time, can be determined.

As a result of the above, a BER-based ROLPC with adaptive compensation for the BER target has been described which accounts for the discrepancies in the mean and median of BER.

It should be noted that one can easily add some features to the basic algorithm described above to make it better suited for practical implementation. For instance, one can place upper and lower limits on SNR-T to prevent wild fluctuations in the same. Also, the amount by which SNR-T is adjusted after each comparison between BER-I and BER-$T_C$ can be made dependent on the size of the difference between BER-$T_C$ and BER-I. This would allow for rapid adjustments when the SNR target is far from where it is needed to be to achieve the desired BER.

Another equivalent way to modify the metric target value (albeit indirectly) is to change the relative magnitudes of the up and down step sizes of the SNR target as a function of the signature of the environment. For example, a value of BER-I is compared with a value of BER-$T_I$ at the end of every received frame. When the value of BER-I is found to be greater than, or equal to, the value of BER-$T_I$, the SNR target value is raised by an amount $\Delta_{up}$ dB. Conversely, if the value of BER-I is less than the value of BER-$T_I$, the SNR target is lowered by an amount $\Delta_{down}$ dB. The ratio $$\frac{\Delta_{up}}{\Delta_{down}}$$

is varied as a function of the signature of the environment. This may be done, for instance, by keeping the value of $\Delta_{up}$ fixed and varying the value of $\Delta_{down}$ as a function of the environment signature; or by keeping the value of $\Delta_{down}$ fixed and varying the value of $\Delta_{up}$ as a function of the environment signature. (The former example is illustrated in the flow chart shown in FIG. 9, the steps of which are similar to those shown in FIG. 8.) Having unequal values for $\Delta_{up}$ and $\Delta_{down}$ introduces a bias, which has the same effect as adding compensation to the BER target value (described above).

As already noted above, the foregoing merely illustrates the principles of the invention and it will thus be appreciated that those skilled in the art will be able to devise numerous alternative arrangements which, although not explicitly described herein, embody the principles of the invention and are within its spirit and scope. For example, although the inventive concept was illustrated herein as being implemented with discrete functional building blocks, e.g., a controller, etc., the functions of any one or more of those building blocks can be carried out using one or more appropriately programmed processors, e.g., a digital signal processor; discrete circuit elements; integrated circuits; etc. In addition, the inventive concept is applicable to other cellular access schemes besides IS-95 or UMTS, power control of other signals received by the base station, and power control by the mobile station of signals received from the base station.

What is claimed is:

1. A method for use in a communications endpoint, the method comprising the steps of:
    determining a signature of a communications channel, wherein the signature of the communications channel is a second order statistic of a signal-to-noise ratio of a signal received from the communications channel;
    performing power control over the communications channel wherein the power control compares a metric value and a target metric value, such that the target metric value is adjusted as a variable function of the determined signature of the communications channel.

2. The method of claim 1 wherein the metric is a bit error rate (BER).

3. The method of claim 1 wherein the determining step includes the steps of:
    collecting signal-to-noise ratio (SNR) values of the signal received from the communications channel; and
    calculating the second order statistic of the collected SNR values.

4. The method of claim 1 wherein the communications endpoint is a wireless endpoint.

5. The method of claim 1 wherein the metric is a symbol error count.

6. The method of claim 5 wherein the determining step includes the step of monitoring the symbol error count of the received signal for determining a standard deviation of the received symbol error count; and the performing step includes the step of adjusting a target symbol error count for the received signal as a function of the standard deviation for use in providing the power control.

7. The method of claim 1 wherein the determining step includes the steps of:
    monitoring a symbol error count of the received signal for determining a standard deviation of a received symbol error count;
    setting a target symbol error rate as a function of the standard deviation; and
    wherein the performing step includes the step of
    adjusting a target signal-to-noise ratio for the received signal depending on the difference between the set target symbol error rate and the actual symbol error count produced by the receiver.

8. The method of claim 1 wherein the performing power control step performs symbol error count based reverse outer loop power control with adaptive symbol error rate targets.

9. A method for use in a communications endpoint, the method comprising the steps of:
    receiving a signal from a wireless endpoint;

developing a second order statistic from the received signal based on a signal-to-noise ratio of the received signal; and performing power control with the wireless endpoint by adjusting a target value as a variable function of the second order statistic.

10. The method of claim 9 wherein the developing step further comprises:

adjusting a bit error rate target value as a function of the second order statistic;

and the performing step includes the step of performing reverse-link outer loop power control as a function of a comparison between a bit error rate value of the received signal and the adjusted bit error rate target value.

11. The method of claim 9 wherein the communications endpoint is a wireless endpoint.

12. The method of claim 9 wherein the power control is a symbol error count based power control.

13. The method of claim 9 wherein the developing step includes the step of monitoring a symbol error count of the received signal for determining a standard deviation of the received symbol error count; and the performing step includes the step of adjusting a target symbol error count for the received signal as a function of the standard deviation for use in providing the power control.

14. The method of claim 9 wherein the developing step includes the steps of:

monitoring a symbol error count of the received signal for determining a standard deviation of the received symbol error count;

setting a target symbol error rate as a function of the standard deviation; and the performing step includes the step of adjusting a target signal-to-noise ratio for the received signal depending on the difference between the set target symbol error rate and the actual symbol error count produced by the receiver.

15. A method for use in a communications endpoint, the method comprising the steps of:

measuring a signature of a fading environment, wherein the measuring includes calculating a standard deviation value of a signal-to-noise ratio of a received signal; and performing power control by adjusting a target metric value as a variable function of the measured signature.

16. The method of claim 15 wherein the performing step uses the standard deviation value of the signal-to-noise ratio to adjust the target metric value.

17. The method of claim 15 wherein the metric value is a bit error rate (BER).

18. The method of claim 15 wherein the performing step adds a value to a signal-to-noise ratio target value, wherein the added value is selected as a function of the measured signature of the fading environment.

19. The method of claim 15 wherein the performing step includes the steps of:

estimating a bit error rate (BER);

comparing the estimated BER to a target BER value; and adjusting a target signal-to-noise ratio value as a result of the comparison by adding a value to the target signal-to-noise ratio;

wherein the value added to the target signal-to-noise-ratio is selected as a function of the measured signature.

20. The method of claim 15 wherein the communications endpoint is a wireless endpoint.

21. An apparatus for use in a communication endpoint, the apparatus comprising:

a receiver for receiving a signal;

a controller for (a) developing a signature of a communications channel from the received signal, wherein the controller further determines the signature of the communications channel by collecting signal-to-noise ratio values of the received signal and by calculating a second order statistic of the collected signal-to-noise ratio values; and (b) performing power control over the communications channel by adjusting a target metric value as a variable function of the signature of the communications channel.

22. The apparatus of claim 21 further comprising a decoder for decoding the received signal and wherein the metric is a bit error rate (BER) of the decoded received signal.

23. The apparatus of claim 21 further comprising a memory for storing a look-up table which maps values of the second order statistic to adjustment values for use in adjusting the target metric value.

24. The apparatus of claim 21 wherein the metric value is signal-to-noise (SNR).

25. The apparatus of claim 21 wherein the target metric value is a target signal-to-noise ratio (SNR) and the controller adjusts the SNR target value by adding a value to the SNR target value, wherein the added value is selected as a function of the developed signature.

26. The apparatus of claim 21 wherein the communications endpoint is a wireless endpoint.

27. The apparatus of claim 21 wherein the metric is a symbol error count.

28. The apparatus of claim 21 wherein the controller monitors a symbol error count of the received signal for determining a standard deviation of the received symbol error count; and adjusts a target symbol error count for the received signal as a function of the standard deviation for use in providing the power control.

29. An apparatus for use in a communications endpoint, the apparatus comprising:

a decoder for decoding a frame of a received signal and for providing a signal representative of log-likelihood ratios with respect to information bits of the decoded frame;

a bit error estimate generator responsive to the signal representative of the log-likelihood ratios for providing a bit error rate estimate; and a processor for performing reverse outer loop power control (ROLPC) over a communications channel wherein the ROLPC performs a comparison between the bit error rate estimate and a target bit error rate value such that the target bit error rate value is adjusted as a function of a signature of the communications channel.

30. The apparatus of claim 29 wherein the processor further determines the signature of the communications channel by calculating a second order statistic of a received signal-to-noise ratio (SNR).

31. The apparatus of claim 30 further comprising a memory for storing a look-up table which maps values of the second order statistic to adjustment values for use in adjusting the target bit error rate value.

32. The apparatus of claim 29 wherein the communications endpoint is a wireless endpoint.

33. Apparatus for use in equipment for providing power control in a cellular system, the apparatus comprising:
- a receiver for receiving a signal from a wireless endpoint;
- a controller for (a) developing a second order statistic from the received signal, wherein the controller calculates the second order statistic of collected signal-to-noise ratio values of the received signal, and wherein said second order statistic is used to determine an adjustment to a target metric value; and (b) performing power control with the wireless endpoint as a variable function of the second order statistic.

34. The apparatus of claim 33 wherein the metric value is a bit error rate (BER).

35. The apparatus of claim 33 wherein the power control is a symbol error count based power control.

36. The apparatus of claim 33 wherein the controller monitors a symbol error count of the received signal for determining a standard deviation of the received symbol error count; and adjusts a target symbol error count for the received signal as a function of the standard deviation for use in providing the power control.

37. The apparatus of claim 33 further comprising a transmitter for transmitting power control information to a mobile station.

* * * * *